United States Patent [19]
Hawkins, III

[11] Patent Number: 5,145,633
[45] Date of Patent: Sep. 8, 1992

[54] BLOW MOLDING A CONTAINER HAVING THREE HANDLES

[75] Inventor: George W. Hawkins, III, Whitakers, N.C.

[73] Assignee: W. R. Grace & Co.-Conn., Duncan, S.C.

[21] Appl. No.: 647,874

[22] Filed: Jan. 30, 1991

[51] Int. Cl.⁵ .................... B29C 49/04; B29C 49/30
[52] U.S. Cl. .................... 264/531; 264/540;
   425/525; 215/1 C; 215/100 A; 220/752
[58] Field of Search ............... 264/531, 534, 523, 524,
   264/525, 540; 425/525, 532; 215/1 C, 100 A;
   220/94 A

[56] References Cited

U.S. PATENT DOCUMENTS

| | | | |
|---|---|---|---|
| 3,317,955 | 5/1967 | Schurman et al. | 18/5 |
| 3,342,916 | 9/1967 | Peters | 264/98 |
| 3,424,829 | 1/1969 | Peters et al. | 264/89 |
| 3,438,538 | 4/1969 | Peters | 220/39 |
| 3,452,125 | 6/1969 | Schurman et al. | 264/89 |
| 3,504,396 | 4/1970 | Button et al. | 18/5 |
| 3,524,488 | 8/1970 | Scholle | 264/534 |
| 3,585,681 | 6/1971 | Branscum et al. | 18/5 |
| 3,663,672 | 5/1972 | Button et al. | 264/96 |
| 3,724,981 | 4/1973 | Schiemann | 425/525 |
| 3,724,987 | 4/1973 | Schiemann | 425/525 |
| 3,792,143 | 2/1974 | Branscum et al. | 264/94 |
| 3,898,310 | 8/1975 | Schiemann | 264/94 |
| 4,070,429 | 1/1978 | Uhlig | 264/534 |
| 4,075,187 | 2/1978 | Olcott | 264/89 |
| 4,086,314 | 4/1978 | Lampart et al. | 425/525 |
| 4,301,111 | 11/1981 | Olcott | 264/515 |
| 4,382,058 | 5/1983 | Watson et al. | 264/527 |
| 4,486,164 | 12/1984 | Wilkie et al. | 425/525 |
| 4,494,651 | 1/1985 | Malcolm | 206/328 |
| 4,541,529 | 9/1985 | Hestehave et al. | 206/510 |
| 4,569,816 | 2/1986 | Schiemann | 264/513 |
| 4,650,627 | 3/1987 | Peters | 425/525 |
| 4,770,839 | 9/1988 | Legge | 264/526 |
| 4,828,786 | 5/1989 | Legg et al. | 264/515 |
| 4,923,098 | 5/1990 | Schoonover et al. | 215/1 C |
| 4,938,680 | 7/1990 | Guarriello et al. | 425/525 |

FOREIGN PATENT DOCUMENTS

| | | | |
|---|---|---|---|
| 61-100433 | 5/1986 | Japan | 264/531 |
| 1059930 | 2/1967 | United Kingdom | 215/1 C |

Primary Examiner—Jan H. Silbaugh
Assistant Examiner—Catherine Timm
Attorney, Agent, or Firm—William D. Lee, Jr.; Jennifer L. Skord; Mark B. Quatt

[57] ABSTRACT

A container such as a jerry can can be produced with one or more handles molded with the blow molded body of the container. This invention eliminates the need for separate injection molded inserts. A first pair of molds, and a second pair of molds having a lower and upper section, are used in the apparatus to close a top portion and a bottom and/or draped portions of a standard parison.

1 Claim, 1 Drawing Sheet

BLOW MOLDING A CONTAINER HAVING THREE HANDLES

BACKGROUND OF THE INVENTION

This invention relates generally to the art of blow molded containers and the molding thereof and more particularly to the art of forming a blow molded container having a handle or handles.

Thermoplastic containers for uses such as service or "jerry" cans are well known in the art. These plastic containers are a substitute for the traditional metal cans.

A standard feature of the thermoplastic versions is the presence of three handles on the can. One handle can typically be blow molded with the container. The outer handles, however, are typically injection molded in a separate process. These injection molded handles are then placed in the mold of a blow molding apparatus and united with the blow molded parison during blow molding of the container and the central handle.

This technique for producing a blow molded container with injection molded handles is expensive, and time consuming. It is desirable to produce a blow molded container for applications such as the 20 liter jerry can application without the need for separately injection molding handle components and then incorporating these injection molded handles into a blow molding apparatus. The inventor has accomplished this by the practice of the present invention.

Of interest are the following patents describing blow molding art generally, and production of plastic jerry cans.

U.S. Pat. No. 3,317,955 (Schurman et al) discloses an apparatus for blow molding hollow containers of one piece construction having hinged body and cover parts.

U.S. Pat. No. 3,342,916 (Peters) discloses a method and apparatus for blow molding hollow articles in which an integral hollow handle is connected to a body portion of the article.

U.S. Pat. No. 3,424,829 (Peters et al) discloses a hollow article with integrally molded hollow handles.

U.S. Pat. No. 3,438,538 (Peters) discloses a blow molded closure with a solid, axially depending container engaging means.

U.S. Pat. No. 3,452,125 (Schurman et al) discloses a method of blow molding a container in which the parison is divided into two separate but integral double wall compartments by pinching the parison upon itself to form a hinge.

U.S. Pat. No. 3,504,396 (Button et al) discloses an apparatus for preparing a parison for blow molding and transferring the parison to the blow molding means.

U.S. Pat. No. 3,585,681 (Branscum et al) discloses a hollow object having an integral hollow portion formed by blow molding. Two mold parts pinch off a portion of the parison to form the adjunct, and the remainder of the parison forms the main body of the blown object.

U.S. Pat. No. 3,663,672 (Button et al) discloses a process for preparing a parison for blow molding.

U.S. Pat. No. 3,792,143 (Branscum et al) discloses a hollow object having an integral hollow adjunct portion formed by blow molding.

U.S. Pat. No. 3,898,310 (Schiemann) discloses a method of making a plastic jerry can from a pair of injection molded plastic shells.

U.S. Pat. No. 4,075,187 (Olcott) discloses a tire shaped article blow molded by extruding a tubular parison between movable mold sections, sealing the open end of the parison, injecting air into the parison, moving a lower mold section and the bottom portion of the parison upwardly, and expanding an intermediate portion of the parison outwardly into a mold cavity.

U.S. Pat. No. 4,301,111 (Olcott) discloses horizontal blow molding.

U.S. Pat. No. 4,382,058 (Watson et al) discloses a single wall, blow molded container with a hinge produced by closing a blow mold with a restricted central portion about the parison.

U.S. Pat. No. 4,486,164 (Wilkie et al) discloses a blow molded container made by inflating a parison within the mold having a hinge forming area.

U.S. Pat. No. 4,494,651 (Malcolm) discloses a portable work station for transporting electrostatic sensitive devices. The work station is blow molded.

U.S. Pat. No. 4,541,529 (Hestehave et al) discloses a blow molded jerry can with a supplemental handle.

U.S. Pat. No. 4,569,816 (Schiemann) discloses an injection molded jerry can.

U.S. Pat. No. 4,770,839 (Legge) discloses a blow molded article made by reverse parison draping.

U.S. Pat. No. 4,828,786 (Legg et al) discloses draped parison blow molding.

SUMMARY OF THE INVENTION

In one aspect of the invention, a method of blow molding a container with at least one handle comprises extruding a parison; closing a bottom portion of the parison between a first pair of mold halves; draping the parison between the first pair of mold halves, and a lower section of a second pair of mold halves; closing the draped portion of the parison between the first pair of mold halves and the lower section of the second pair of mold halves; closing a top portion of the parison between an upper section of the second pair of mold halves; and blowing the parison into a container having at least one handle formed at the bottom portion of the parison.

In another aspect of the invention, a blow molding apparatus comprises a first pair of mold halves; a second pair of mold halves having a lower section and an upper section; the lower section of the second pair of mold halves capable of communicating with the first pair of mold halves.

In yet another aspect of the invention, a blow molded container with at least one handle is made from the method described above.

DETAILED DESCRIPTION

In accordance with this invention, it has been found that a blow molded container having at least one handle, and preferably three handles may be formed by the practice of the present invention.

Figure 1:
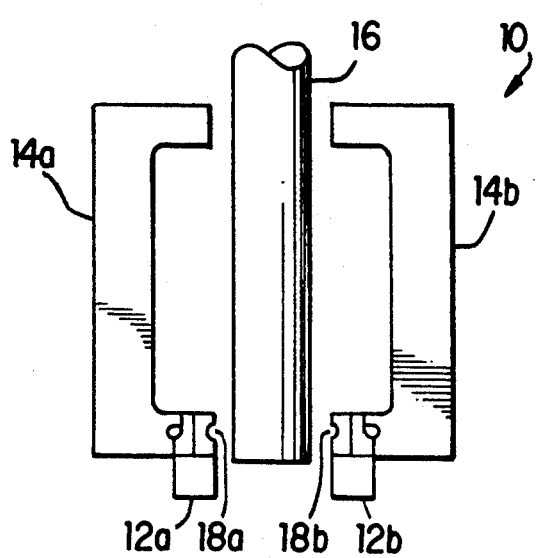
FIG. 1 is a schematic side view of the first and second pairs of mold halves in their original position, with a parison positioned between them.

A side view of a blow mold, in accordance with this invention, is illustrated in FIGS. 1-4 of the drawings, in the preferred sequence of the inventive method. Shown in FIG. 1 is a blow mold 10 in the open position and comprising a first pair of mold halves 12 made up of mating halves 12a and 12b, and a second pair of mold halves 14 made up of mating halves 14a and 14b. Suspended between the mold halves is a parison 16. The parison is of an open tubular form which would then be pinched closed by the closing of the mold halves as described in more detail below. The parison 16 originates from a conventional extrusion source (not shown).

Any blow moldable thermoplastic material may be utilized. Such materials include high density polyethylene, polypropylene, polyvinyl chloride and elastomeric polyolefins. The extrusion die may be programmed so as to vary the wall thickness of various portions of the parison so as to minimize any effects of sagging. Such techniques are well known in the art.

As shown in FIG. 1, parison 16 is positioned between the mold halves 12a and 12b, and the mold halves 14a and 14b.

In the preferred embodiment, mold halves 12a and 12b each include a recess 18a and 18b.

Figure 2:
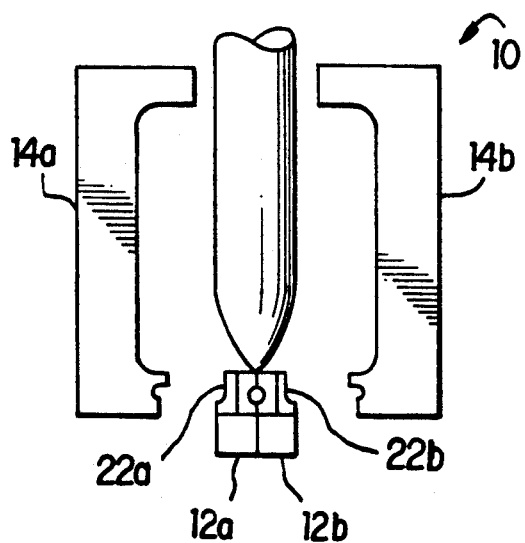
FIG. 2 is a schematic side view of a progressive step in the inventive method where the first pair of mold halves closes a bottom portion of the parison.

As shown in FIG. 2, mold halves 12a and 12b are brought together to close off the bottom portion of the parison. This creates a handle shaped area where recesses 18a and 18b trap the parison material. This area, after blowing the parison, will form the central handle of the preferred container.

Figure 3:
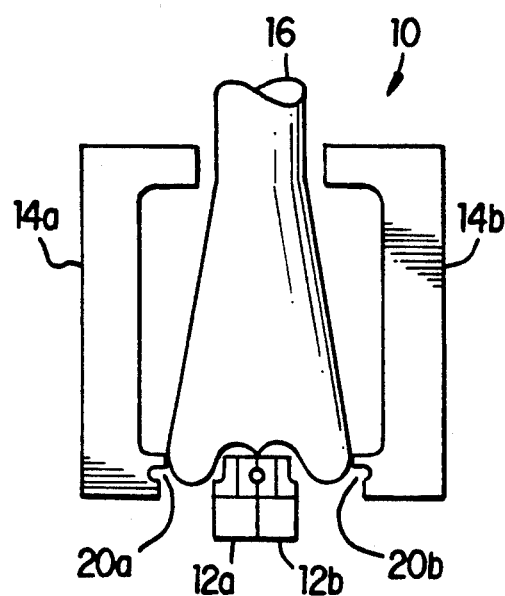
FIG. 3 is a schematic side view of the invention where the parison is draped between the closed first pair of mold halves and lower sections of the second pair of mold halves.

Referring to FIG. 3, the parison is dropped further, draping over and past the first pair of mold halves 12a, 12b, and between the first pair of mold halves 12 and the lower section of each of the mold halves 14a and 14b.

Figure 4:
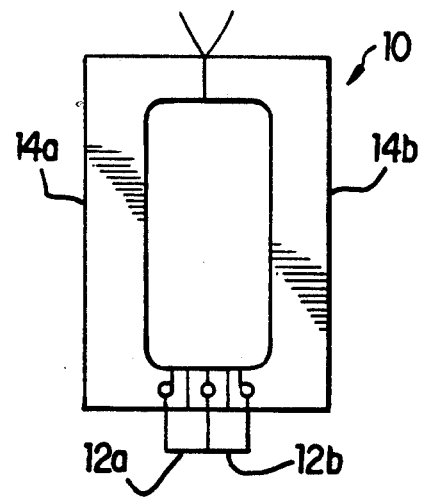
FIG. 4 is a schematic side view of the first and second pairs of mold halves both in the closed position.

Finally, referring to FIG. 4, the second pair of mold halves 14a, b is brought together at its lower and upper sections to trap the parison as shown. Preferably, the lower section of mold halves 14a and 14b includes a recess 20a and 20b similar to recesses 18a and 18b. When mold halves 14a and 14b are brought together, the lower sections of these halves communicate with the outer portions of mold halves 12a and 12b to form a handle shaped recess in the parison material trapped between the respective sections. The upper section of mold halves 14a and 14b close the parison material together.

The final step in producing blow molded articles is the blowing or inflation step. The inflation step is carried out by the use of a needle (not shown) which communicates with a source of pressurizing fluid. Such inflation techniques are well known in the art.

One, two, or three handles can be made by the process of the present invention. This can be done by modifying the steps of the process, using substantially the same apparatus, to control where handles are formed in the final container. For example, mold halves 12 can be brought together along with mold halves 14a,b to close the parison at the top and central bottom portions of the parison. Without a subsequent draping step as described, the result is a blow molded container with one central handle. Alternatively, the mold halves 12a,b can be brought together before the parison is passed between them. In this way, no parison material is entraped between mating halves 12a and 12b. The result would be two handles in the final container, without a central handle. In the preferred embodiment, three handles are formed by the method described.

The recesses 18a,b and 20a,b as well as 22a,b disposed on the outer surfaces of mating halves 12a, b, can be of any suitable shape, length, etc. One or more of these recesses can be eliminated as long as the desired number and shape of handles is produced. Those skilled in the art will understand that such modifications are within the scope and spirit of the claims which follow.

What is claimed is:

1. A method of blow-molding a container with three handles comprising:
    a) extruding a parison;
    b) closing a first portion of the parison between a first mold half and a second mold half, each mold half having a recess disposed therein such that when the first and second mold halves are closed together, the two recesses form a first cavity in which the first portion of the parison is formed into a first handle;
    c) while gripping the first portion of the parison between the first and second mold halves, draping
        i) a second portion of the parison between the first mold half and a lower section of a third mold half, each mold half having a recess disposed therein such that, when the first and third mold halves are closed together, the two recesses form a second cavity in which the second portion of the parison is formed into a second handle, and
        ii) a third portion of the parison between the second mold half and a lower section of a fourth mold half, each mold half having a recess disposed therein such that, when the second and fourth mold halves are closed together, the two recesses form a third cavity in which the third portion of the parison is formed into a third handle;
    d) after draping the second portion of the parison between the first and third mold halves and the third portion of the parison between the second and fourth mold halves, trapping
        i) the second portion of the parison in the second cavity by closing the first and third mold halves, and
        ii) the third portion of the parison in the third cavity by closing the second and fourth mold halves;
    e) trapping a fourth portion of the parison by closing an upper section of the third and fourth mold halves; and
    f) blow-molding the parison into the container having three handles.

* * * * *